United States Patent [19]

Dominguez

[11] 4,448,904

[45] May 15, 1984

[54] REACTION INJECTION MOLDED ELASTOMER USING A METHYLENE BIS(PHENYLISCOYANATE) CONTAINING 2,4' ISOMER IN AMOUNTS GREATER THAN ABOUT 10 PERCENT

[75] Inventor: Richard J. G. Dominguez, Austin, Tex.

[73] Assignee: Texaco Inc., White Plains, N.Y.

[21] Appl. No.: 502,397

[22] Filed: Jun. 8, 1983

[51] Int. Cl.$^3$ .............................................. C08G 18/14
[52] U.S. Cl. ..................................... 521/160; 521/163; 521/167; 528/67; 528/68; 528/76; 528/77
[58] Field of Search ....................... 521/160, 163, 167; 528/67, 68, 76, 77

[56] References Cited

U.S. PATENT DOCUMENTS 3,394,164 7/1968 McClellan et al. ................ 521/159
4,246,363 1/1981 Turner et al. ........................ 521/163
4,269,945 5/1981 Vanderhider et al. ............. 521/159

*Primary Examiner*—Maurice J. Welsh
*Attorney, Agent, or Firm*—Robert A. Kulason; Jack H. Park; Kenneth R. Priem

[57] ABSTRACT

The invention is a method of making a molded reaction injection molded elastomer. The reaction injection molded (RIM) elastomer is made by injecting via a RIM machine into a mold cavity of the desired configuration, a formulation comprising in the first stream amine terminated polyethers of greater than 1,500 molecular weight, a chain extender, and in the second stream methylene bis(phenylisocyanate) with a 2,4' isomer of greater than about 10%. RIM elastomers are useful, for example, for automobile body parts.

12 Claims, No Drawings

REACTION INJECTION MOLDED ELASTOMER USING A METHYLENE BIS(PHENYLISCOYANATE) CONTAINING 2,4' ISOMER IN AMOUNTS GREATER THAN ABOUT 10 PERCENT

This application is related to application Ser. No. 371,160; application Ser. No. 371,161; application Ser. No. 371,376; and application Ser. No. 371,377, all filed Apr. 23, 1982. Applications having Ser. No. 502,382 and Ser. No. 502,389, both filed on even date, are also related.

BACKGROUND OF THE INVENTION

1. Field of the Invention

This invention concerns the field of reaction injection molded elastomers using high molecular weight amine terminated polyethers.

2. Description of the Prior Art

In the manufacture of RIM elastomers for use as fascia on automobiles, properties are enhanced by using methylene bis(phenylisocyanate). By using MDI-type isocyanates, elongation and rubberyness are enhanced over the use of higher functionality isocyanates. Since higher functionality isocyanates which improve green strength cannot be used, MDI isocyanates containing a predominance of the 4,4' isomer (usually greater than 90%) are used to enhance the green strength properties.

Therefore, the use of conventional polyols to make RIM elastomers for fascia applications demands the use of an MDI isocyanate containing 90% or more of the 4,4' MDI isomer in order to obtain the acceptable properties of the finished RIM part. In commercially available MDI products the 2,4' isomer has usually been reduced to less than 10% by separation techniques such as distillation. I have discovered a method of making RIM elastomers which allows the use of MDI isocyanates containing less than about 90% 4,4' isomers and, therefore, greater than about 10% 2,4' isomers, but where the properties of the finished RIM part are still excellent. The use of this much less expensive MDI product is of economic benefit.

SUMMARY OF THE INVENTION

The invention is a method of making a RIM elastomer comprising injecting into a mold cavity of the desired configuration, a formulation comprising primary or secondary amine terminated polyethers of greater than 1,500 molecular weight wherein greater than 50% of the active hydrogens are in the form of amine hydrogens, an amine terminated Chain extender and a methylene bis(phenylisocyanate) wherein the 2,4' isomer is present in amounts greater than 10%. The invention is also the resulting RIM elastomer made from the method above.

DESCRIPTION OF THE PREFERRED EMBODIMENTS

Amine terminated polyethers useful in this invention include primary and secondary amine terminated polyether polyols of greater than 1,500 average molecular weight having from 2 to 6 functionality, preferably from 2 to 3, and an amine equivalent weight from about 750 to about 4,000. Mixtures of amine terminated polyethers may be used. In a preferred embodiment the amine terminated polyethers have an average molecular weight of at least 2,500. These materials may be made by various methods known in the art.

Amine terminated polyether resins useful in this invention, for example, are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

The amine terminated chain extenders, for example, aromatic diamine chain extenders useful in this invention include, for example, 1-methyl-3,5-diethyl-2,4 diaminobenzene, 1-methyl-3,5 diethyl-2-6 diaminobenzene (both of these materials are also called diethyltoluene diamine or DETDA), 1,3,5-triethyl-2,6 diaminobenzene, 3,5,3',5'-tetraethyl-4,4" diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

The aromatic polyisocyanate useful in my invention is MDI containing greater than about 10% 2,4' isomer. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI. U.S. Pat. No. 3,394,164 is an example of liquid MDI product. More generally uretonimine modified pure MDI is included also. This product is made by heating pure distilled MDI in the presence of a catalyst. The liquid product is a mixture of pure MDI and modified MDI:

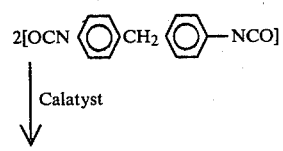

-continued

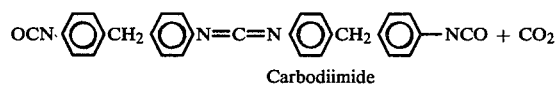

Carbodiimide

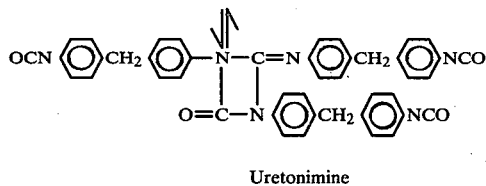

Uretonimine

Examples of commercial materials of this type are Upjohn's ISONATE® 125M (pure MDI) and ISONATE 143L ("liquid" MDI). Preferably the amount of isocyanates used in the stoichiometric amount based on all the ingredients in the formulation or greater than the stoichiometric amount.

As stated above, the MDI useful in the process of this invention contains greater than about 10% of the 2,4' isomer. Applicant points out that the amount, 10%, is chosen to represent those isocyanates wherein the 2,4' isomer has not been removed by distillation to any great extent. Patent literature such as U.S. Pat. No. 3,394,164 referred to above points out that the 4,4' isomer in a typical liquid product comprises about 90% or more of the isocyanate.

The use of catalysts such as those listed below are optional since the high reactivity of the amine terminated polyethers usually precludes the need for catalysts.

Catalysts such as tertiary amines or an organic tin compound or other polyurethane catalysts are used. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Of course, the term polyisocyanate also includes quasi-prepolymers of polyisocyanates with active hydrogen containing materials.

Other conventional formulation ingredients may be employed as needed such as; for example, foam stabilizers, also known as silicone oils or emulsifiers. The foam stabilizers may be an organic silane or siloxane. For example, compounds may be used having the formula:

RSi[O—(R$_2$SiO)$_n$—(oxyalkylene)$_m$R]$_3$ wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Reinforcing materials, if desired, useful in the practice of our invention are known to those skilled in the art. For example, chopped or milled glass fibers, chopped or milled carbon fibers and/or other mineral fibers are useful.

Post curing of the elastomer of the invention is optional. Post curing will improve some properties such as heat sag. Employment of post curing depends on the desired properties of the end product.

Mold release agents are useful for the method of this invention and can be external or internal mold release agents. The preferred internal mold release agent is Dow Corning Q2-7119. This mold release agent is a dimethyl siloxane with organic acid groups manufactured by Dow Corning Corporation.

The examples which follow exemplify this invention. However, these examples are not intended to limit the scope of the invention.

EXAMPLE I

Comparison Example

The following formulation was reaction injection molded on an Accuratio VR-100 RIM machine:

| B-Component | | A-Component | |
|---|---|---|---|
| THANOL® SF-5505[1], pbw | 42.2 | Upjohn Code 1246 (1:1 by weight of a high 2,4' MDI (~ 15-20%) and THANOL SF-5505 quasi-prepolymer) 80.8 pbw | |
| Diethyltoluenediamine, pbw | 18.9 | | |
| Dibutyltin dilaurate, pbw | 0.05 | | |

[1] A 5500 molecular weight polyether triol containing about 80% primary hydroxyl groups. A product of Texaco Chemical Co., Inc.

This material has a tacky surface and is rather limp at demold. It would be difficult to successfully mold this material in a mold with any degree of complexity. Therefore, this material would be unacceptable for production.

EXAMPLE II

Comparison Example

The following formulation was run on an Accuratio VR-100 RIM machine:

| B-Component | | A-Component | |
|---|---|---|---|
| THANOL SF-5505, pbw | 42.2 | Upjohn Code 1246, pbw | 176.2 |
| Ethylene glycol, pbw | 15.3 | | |
| Dibutyltin dilaturate, pbw | 0.05 | | |

The above material was extremely limp and left loose skin in the mold. It would be totally unacceptable as a commercial RIM elastomer.

EXAMPLE III

Comparison Example

The same B-component as in Example II was run against Upjohn Code 1247 isocyanate. This isocyanate is a 2:1 isocyanate/THANOL SF-5505, analogous to the Upjohn Code 1246 isocyanate. This run was made because it should produce a much stiffer elastomer. In spite of this, the material is still very limber and skin pulls off the parts and sticks to the mold at demold.

EXAMPLE IV

The following formulation was reaction injection molded on an Accuratio VR-100 RIM machine.

| B-Component | | A-Component | |
|---|---|---|---|
| JEFFAMINE® T-5005 polyamine[1], pbw | 62.33 | Rubinate, pbw | 49.6 |
| Diethyltoluene-diamine, pbw | 17.7 | (ICI) 4397-76 | |
| Q2-7119 internal release, pbw | 0.7 | high 2,4 MDI content quasi-prepolymer | |

[1] A polyoxypropylene triamine of about 5,000 molecular weight; a product of Texaco Chemical Co., Inc.

The A-component Rubinate 4397-76 has higher 2,4 MDI content (about 15% by weight) as compared to triple-distilled MDI (about 2 to 5% by weight). In spite of this fact, the material has excellent heat sag (19 mm of heat sag) as compared to the same formulation run with standard 95% or greater 4,4' MDI isocyanate (16 mm of heat sag). However, the product of Example I has higher "green strength" when compared to the high 4,4' MDI isocyanate containing product. This is surprising since if the polyether polyamine were to be substituted by a polyether polyol (see previous examples), it is well known that the "green strength" of high 2,4 MDI isocyanate containing product would be very poor. Thus, JEFFAMINE polyether polyamines have an advantage over standard polyether polyols since they can be used with much more inexpensive isocyanates and still make a good RIM elastomer both in processing and final properties.

EXAMPLE V

In a similar formulation to the one used in Example I, a high 2,4 MDI isocyanate content A-component was run with JEFFAMINE T-5000 polyamine. The formulation was as follows:

| B-Component | | A-Component |
|---|---|---|
| Jeffamine T-5000 poly-amine, pbw | 62.33 pbw | Isonate code 223 (Upjohn) a high 2,4 MDI isocyanate containing material |
| DETDA, pbw | 18.9 | |
| Q2-7119, pbw | 0.7 | 62.8 pbw |

This material also had excellent heat sag (13 mm) and good moldability.

I claim:

1. A method for making a reaction injection molded elastomer comprising injecting into a mold cavity of desired configuration, a formulation comprising primary or secondary amine terminated polyethers of greater than about 1,500 molecular weight wherein greater than 50% of the active hydrogens are in the form of amine hydrogens, an amine terminated chain extender and a methylene bis(phenylisocyanate) wherein the 2,4' isomer is present in amounts greater than about 10%.

2. A method as in claim 1 wherein the amine terminated polyether has a functionality of about 2 to 6.

3. A method as in claim 2 wherein the functionality of the amine terminated polyethers is from about 2 to 3.

4. A method as in claim 1 wherein the amine terminated polyether has a molecular weight greater than about 2,500.

5. A method as in claim 1 wherein the 2,4' isomer comprises about 15% of the isocyanate.

6. A RIM elastomer made by injecting into a mold cavity of the desired configuration, a formulation comprising primary or secondary amine terminated polyethers of greater than about 1,500 molecular weight wherein greater than 50% of the active hydrogens are in the form of amine hydrogens, an amine terminated chain extender and a methylene bis(phenylisocyanate) wherein the 2,4' isomer is present in amounts greater than about 10%.

7. A method as in claim 6 wherein the amine terminated polyether has a functionality of about 2 to 6.

8. A method as in claim 7 wherein the amine terminated polyether has a functionality of about 2 to 3.

9. A method as in claim 6 wherein the amine terminated polyether has a molecular weight greater than about 2,500.

10. A method as in claim 6 wherein the 2,4' isomer comprises about 15% of the isocyanate.

11. A method for making a RIM elastomer comprising injecting into a mold cavity of the desired configuration, a formulation comprising primary or secondary amine terminated polyethers of greater than about 5,000 molecular weight wherein greater than 50% of the active hydrogens are in the form of amine hydrogens, an amine terminated chain extender and a methylene bis(phenylisocyanate) wherein the 2,4' isomer is present in amounts greater than about 10%.

12. A RIM elastomer made by injecting into a mold cavity of the desired configuration, a formulation comprising primary or secondary amine terminated polyethers of greater than about 5,000 molecular weight wherein greater than 50% of the active hydrogens are in the form of amine hydrogens, an amine terminated chain extender and a methylene bis(phenylisocyanate) wherein the 2,4' isomer is present in amounts greater than about 10%.

* * * * *